United States Patent [19]

Zimmer

[11] Patent Number: 4,540,491

[45] Date of Patent: Sep. 10, 1985

[54] METHOD OF AND APPARATUS FOR THE MECHANICAL-BIOLOGICAL TREATMENT OF SEWAGE

[75] Inventor: Erich Zimmer, Ikeja, Nigeria

[73] Assignee: Water Engineering and Plant Construction GtA reg. Trust, Vaduz, Liechtenstein

[21] Appl. No.: 628,763

[22] Filed: Jul. 9, 1984

[30] Foreign Application Priority Data

Jul. 9, 1983 [DE] Fed. Rep. of Germany ....... 3324853

[51] Int. Cl.³ .............................................. C02F 3/08
[52] U.S. Cl. .................................. 210/619; 210/150; 261/92
[58] Field of Search ....................... 210/619, 150, 151; 261/92

[56] References Cited

U.S. PATENT DOCUMENTS

| | | | |
|---|---|---|---|
| 3,956,127 | 5/1976 | Holmberg | 210/150 |
| 4,160,736 | 7/1979 | Prosser | 210/619 X |
| 4,200,532 | 4/1980 | Iwatari et al. | 210/151 |
| 4,268,385 | 5/1981 | Yoshikawa | 210/150 |
| 4,284,503 | 8/1981 | Stahler | 210/150 |
| 4,330,408 | 5/1982 | McClure | 210/150 X |
| 4,444,658 | 4/1984 | Hankes et al. | 210/619 X |

Primary Examiner—Thomas Wyse
Attorney, Agent, or Firm—Toren, McGeady, Stanger, Goldberg & Kiel

[57] ABSTRACT

In a plant for the mechanical-biological treatment of sewage, an immersion element is rotatably mounted within a settling tank so that the element rotates about a horizontal axis. The immersion element includes a perforated outer tube and an inner tube spaced concentrically within the outer tube. The opposite ends of the tubes are connected by plates so that the immersion element forms an enclosed space filled with support elements for biological growth. The outer tube is formed of sheet metal and holes, elongated in the rotational direction, are punched out of the sheet metal with the punched material forming outwardly directed projections. The immersion element is rotated by a drive motor and during rotation at relatively high speeds the projections from the outer tube extend above the water level and draw air into the sewage and form a sewage-air mixture rotating at high speed.

22 Claims, 7 Drawing Figures

METHOD OF AND APPARATUS FOR THE MECHANICAL-BIOLOGICAL TREATMENT OF SEWAGE

SUMMARY OF THE INVENTION

The invention relates to the mechanical-biological treatment of sewage using a rotatable immersion element positioned within a body of sewage in a settling tank. The immersion element includes a perforated outer tube filled with loose support elements or bodies for biological growth or biota. The invention also relates to a method of sewage treatment using such apparatus.*

* Biological growth or biota means a biologically active film of micro-organisms present in the sewage and adhering to the support elements. (Vide U.S. Pat. No. 3,837,492.)

Sewage treatment plants utilizing immersion elements are known. They have not been used for a considerable period of time, however, because the loose elements accumulate sludge at a disproportionately fast rate and the treatment operation changes over from aerobic to anaerobic sludge decomposition. Such a changeover should not occur in a good sewage treatment plant.

Another disadvantage of such sewage treatment plants is that the sludge can easily deposit in the corners of the settling tank. To prevent such deposited sludge from decomposing anaerobically, it must be kept continuously in motion. To achieve such continuous motion special units are required.

Swiss Pat. No. 50 963 discloses an immersion element with a drivable shaft and arranged coaxially about the shaft spaced outwardly from it there is a perforated inner tube and a perforated outer tube. The space between the two tubes is filled with loose support elements for biological growth. This known immersion element rotates while about one-third of its volume extends into the sewage. Above the level of the sewage, the biological growth is saturated with oxygen, and in the immersed state the oxygen is carried into the sewage. The assembly of such immersion elements presents problems. Moreover, such elements easily accumulate sludge and the sewage becomes malodorous.

In German Offenlegungsschrift No. 1 815 001, another immersion element is known which is made up of annular, sectional, or cube-shaped parts arranged annularly in rows around a driven shaft. In each part there is a stack of plastic plates with a wavy or undulating surface with the plates arranged one upon the other in layers. The plates serve as support or growth elements for the biological growth. The plates are arranged vertically relative to the shaft so that when they extend upwardly from the level of the sewage, the sewage can quickly run off the plate surfaces. In this arrangement, the immersion element is also only immersed into the sewage for approximately one-third of its diameter.

Still another mechanical-biological apparatus for sewage treatment is set forth in German Auslegeschrift No. 1 184 286. This apparatus employs a horizontally rotatable aeration cylinder containing a special filling material. Sewage to be treated is fed in at one end of the cylinder and is carried by special guide surfaces to the other end. The filling material, which completely fills the interior of the cylinder, has the shape of scoops. During rotation, the scoop-shaped filling material picks up a specific amount of sewage and carries it upwardly where it is poured out and trickles downwardly through the cylinder. During such movement, the sewage comes in close contact with the biological growth which has formed on the filling material. In such a treatment plant, a large part of the biologically active surface does not participate in the treatment of the sewage.

Other cylinder-shaped immersion elements are disclosed in the German Offenlegungsschrifts Nos. 26 38 665 and 37 37 991. These patent publications show an immersion element with a central driven shaft mounting a tube which is perforated in sections. The interior of the immersion element is divided into chambers by bent imperforate partitions. Within the immersion element the biological growth is also present on stacks of plastic plates with suitably constructed surfaces. As with the apparatus discussed above, this immersion element is only immersed into the sewage for approximately one-third of its volume or diameter.

The perforations and sections of the outer tube and the construction and arrangement of the partitions are adjusted so that when the chambers are immersed into the sewage, a certain amount of air is carried along with the sewage. The air starts to flow out through the perforations in the outer tube as soon as the chamber passes its lowest position. As a result, a certain oxygen enrichment of the sewage takes place in the settling tank itself, however, the portion of the biological growth support element which is located in the air bubble does not participate in the sewage treatment as long as the air does not flow out of the chamber. Accordingly, the biological decomposition efficiency of a treatment plant using such an immersion element is not higher than in the plants described above.

In German Pat. No. 29 11 975, another type of immersion element for mechanical-biological sewage treatment plants is set forth. In this plant the immersion element consists of a central hollow shaft on which a polygonal cylinder formed of sheet metal plates is supported by partitions so that the interior of the cylinder is divided into a number of chambers. Each chamber is filled with plastic plates arranged in layers and having a suitable surface. Slots in the cylinder are arranged so that during immersion of a chamber into the sewage, a large amount of air is carried along. With the aid of additional partitions, the air is circulated inside the chamber. Furthermore, the hollow shaft is provided with individual openings so that the air enclosed in the chambers can flow from the bottom chamber to the hollow shaft and from the shaft into the upper chambers. Further, in this embodiment, the part of the support element which projects into the air bubble does not participate in the sewage treatment, since the air can flow off through the hollow shaft, the decomposition efficiency is somewhat improved as compared to the apparatus described above.

German Offenlegungsschrift No. 31 09 184 discloses a modification of the above-described plant. Additional chambers are provided on the outside of the polygonal cylinder so that additional air can be drawn in below the level of the sewage. Air enclosed in these additional chambers can flow into the sewage after the chambers pass the lowest dead center. Since air does not come in contact with the plate-shaped support elements, any improvement in the biological decomposition efficiency is hardly measurable.

From the state of the art as set forth above it can be appreciated that it has been often attempted to introduce additional amounts of air into the sewage and at the same time permit the immersion element to travel more deeply into the sewage, however, these attempts, at most, have met with only very limited success. The specific energy consumption has been of significant importance in the prior art, that is, the ratio of the biological decomposition efficiency to the mechanical drive power. Since these desired goals have not been achieved with the treatment plants described above, at the present time other types of immersion elements are utilized. These immersion elements relate to a plurality of cylindrical partial elements filled with the known plastic plates provided with a suitable surface arranged in layers and positioned with the aid of spoke-like struts attached on a central drive shaft. The partial elements of these immersion elements are either completely out of the sewage or are completely immersed in the sewage, so that again by means of appropriate partial perforations in the outer tube or shell, air is introduced into the sewage. This type of immersion element which is used at the present time, in addition to the above described embodiments, is shown in the German Offenlegungsshrifts Nos. 26 38 665 and 27 27 991.

Therefore, the primary object of the present invention is to provide a mechanical-biological sewage treatment plant incorporating a simple mechanical construction which can be used in either large or small plants and which affords the introduction of oxygen as well as motion energy into the sewage with an improved degree of efficiency. Further, this treatment plant affords increased clarification and permits increased capacity.

In accordance with the present invention, an inner tube is arranged concentrically with the outer tube and the inner and outer tubes are connected at the opposite ends by plates which also support the tubes on axle journals. The outer tube is shaped on its outside surface so that as the immersion element rotates, an intensely turbulent sewage-air mixture is developed in the settling tank. Further, the immersion element is filled with support elements which have a large inside surface and the outer surface of the elements are arranged so that the sewage-air mixture can pass over the inside surfaces.

The term outer tube is used to point out that this tube limits the radially outer extent of the support elements on which the biological growth is located.

With an inner tube located within the outer tube in the immersion element, there is a limitation on the space available for the support elements, such as in the situation when biological decomposition is not to be expected in the center of the immersion element due to a lack of oxygen.

A significant advantage of the present invention involves the high stability of the immersion element. Although the tubes and the end plates forming the immersion element are constructed of relatively thin walled sheet metal which may also be perforated, the rotatable immersion element may easily have a structural length of up to 10 meters without any strength problems.

Further, a so-called blade tube can be arranged concentrically to and positioned radially outwardly from the outer tube. The blade tube supports the supply of air into the sewage and the movement of the sewage-air mixture. Further, this arrangement is simple to manufacture as compared to the placement of individual, turbine-like blades on the outside surface of the outer tube.

To a great extent, the present invention prevents the different operational phases which had to be carried out in the prior art sewage treatment plants, such as the surfacing phase for oxygen enrichment and the immersion phase for biological decomposition. The rotatable immersion element generates an intensely turbulent sewage-air mixture in the settling tank so that the biological growth which forms on the growth or support elements is always in a medium which affords oxygen enrichment as well as biological decomposition. As a result, it is possible to maintain the support elements within the immersion element almost continuously below the water or sewage level in the settling tank. Accordingly, the immersion element can remain completely immersed. In practical applications, however, a part of the immersion element is located above the water level because it has been proven that, in this manner, the immersion elements carry along considerable amounts of air.

To generate the turbulent sewage-air mixture, the immersion element must rotate at a considerably higher speed than the previously used immersion elements. This feature affords the possibility to introduce increased movement energy into the sewage, whereby the deposition of sludge is prevented even in large tanks, and a longer dwell period of the sewage is achieved which is favorable for the increased treatment action and the increased capacity of the plant.

It can be appreciated that the advantages achieved with the present invention are enhanced by a special construction of the filler or support elements. With such elements it is possible to provide a large amount of biological growth and, at the same time, prevent sludge formation, because with the individual support elements there is sufficient space for the flow of the sewage through the immersion element.

Preferably, the support elements are spherically shaped and are made up of a number of webs disposed in spaced relation. The shape and dimensions of the webs and the spaces therebetween are selected so that adjacent support elements do not interengage one another while affording adequate access of the sewage-air mixture to the biological growth. To assure a maximum introduction of oxygen and motion energy into the sewage at a minimum driving power in a preferred arrangement of the invention, the outer tube can be equipped with blades on its outer surface, similar to turbine blades.

Another feature of the invention is the provision of the perforations in the outer tube by punching oblong holes in the sheet metal forming the tube and shaping the punched-out metal in an S-like configuration projecting outwardly from the outside surface of the outer tube. The oblong holes and the projections extend in the direction of rotation of the immersion element. Such an arrangement affords optimum material utilization. To afford maximum access of the sewage-air mixture to the biological growth, the holes in the outer tube are selected to be as large as possible. The dimensions of the holes are limited merely by the dimensions of the support elements.

According to another embodiment of the invention, the inner tube can be filled with air. By filling air into the inner tube it is provided with buoyancy which not only compensates for the weight of the inner tube but also for a part of the weight of the rest of the construction. The amount of buoyancy depends on the diameter of the inner tube, and a compromise must be struck between the amount of buoyancy and the size of the space between the inner tube and the outer tube available for the support elements.

A special feature of the sewage treatment of the present invention is the high surface speed at the circumferential periphery of the outer tube, or optionally at the radially outer blade tube, which speed is at such a rate that an intensely turbulent sewage-air mixture results so that the support elements for the biological growth are continuously in movement. Because of this feature, the space in the immersion element containing the growth elements can rotate practically completely below the water level. If the space containing the growth elements extends at least partially upwardly above the water level, then the growth elements serve as blade elements which introduce a considerable amount of air into the sewage. Experience has shown that long after the rotation of the immersion element has stopped, air bubbles continue to rise from the support elements. Moreover, when such bubble formation stops, the growth elements still contain considerable amounts of air which forms bubbles during a further careful rotation of the immersion element. As long as the biological growth has both sewage and air available the sludge being treated is decomposed.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred elements of the invention.

DETAILED DESCRIPTION OF THE INVENTION

Figure 1:
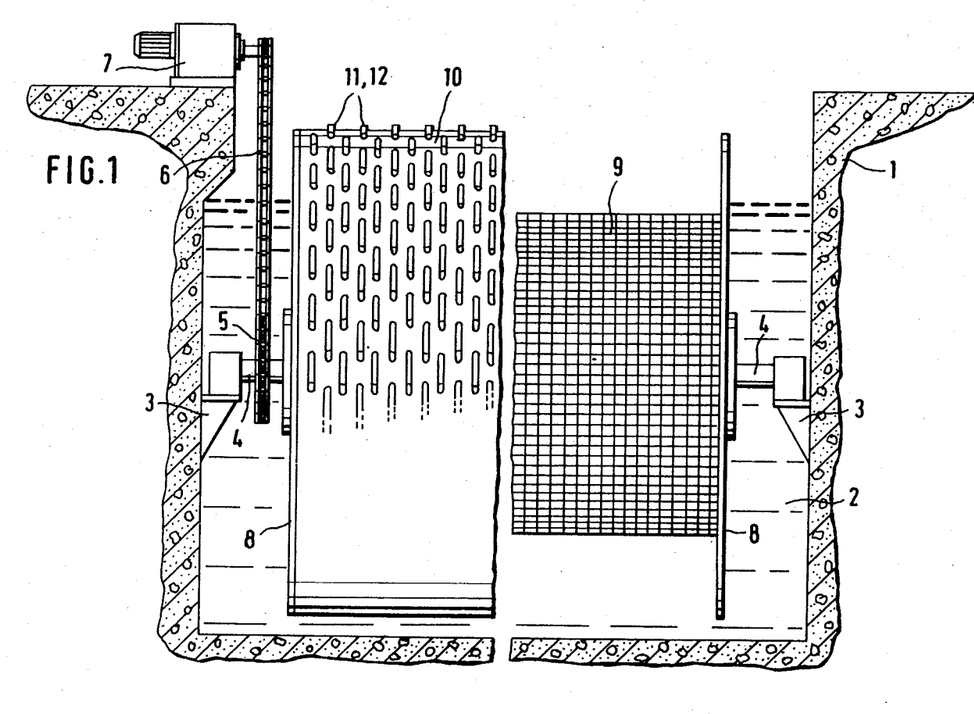
FIG. 1 is a cross-sectional view of a settling tank showing an immersion element embodying the present invention partially cut and broken away.

In FIG. 1 a sewage treatment plant is shown including a settling tank 2. On the opposite sides of the settling tank at about the midpoint of its height, bearings 3 are secured. Axle journals 4 are positioned on the bearings 3 and support an immersion element including a perforated inner tube 9 and a perforated outer tube 10 with the outer tube spaced radially outwardly from the inner tube forming an annular open space between them. At the opposite ends of the inner and outer tubes, which extend transversely of the central axis through the axle journals 4, closure plates 8 are provided. The plates 8 connect the inner and outer tubes and support the tubes on the axle journals 4. A drive disc 5 is secured on the left axle journal in FIG. 1 and a drive member 6, such as a chain, is trained around the drive disc and is driven, in turn, by a geared motor 7 for rotating the end plates 8, the inner tube 9 and the outer tube 10 about the central axis of the immersion element.

Inner tube 9 is formed of sheet metal which has been punched in the form of a grating. In such an arrangement, an optimum passage of sewage or sewage-air mixture is obtained.

The outer tube 10 is provided with a regular arrangement of oblong holes 11. The long dimension of the oblong holes 11 extend in the direction of rotation of the immersion element. The outer tube 10 is formed of sheet metal and the oblong holes are punched out so that a part of the punched material remains attached to the sheet metal and the remainder is formed in a S-shape with at least a part of the S-shape projecting outwardly from the outer surface of the outer tube, note the arrangement of the punched out material in FIG. 2. These S-shaped metal tongues or projections 12 form blades which transmit motion to the sewage when the immersion element is rotated about its central axis so that the deposition of sludge at the bottom of the tank 2 is prevented. With an adequate rotational speed, the projections 12 carry air/oxygen into the sewage.

In FIG. 1 the water level W.L. or level of the sewage is shown with the immersion element set into the sewage in the tanks 2 so that the inner tube 9 is almost completely submerged. Though not illustrated in FIG. 1, the space between the inner tube 9 and the outer tube 10 is filled with support elements 17 for the biological growth. With the rotation of the immersion element generating a sewage-air mixture and introducing large amounts of air into the sewage, the usual distinction between the surfacing phase and the immersion phase is almost completely eliminated.

In tests which have been performed it has been noted that the water level W.L. is higher where the immersion element rises upwardly from the waste water than in the remainder of the tank. Due to the special configuration of the immersion element as well as the centrifugal force developed during rotation, a flow is generated which pumps air and sewage from the tank axially into the immersion element and through the support elements and over the biological growth.

Figure 2:
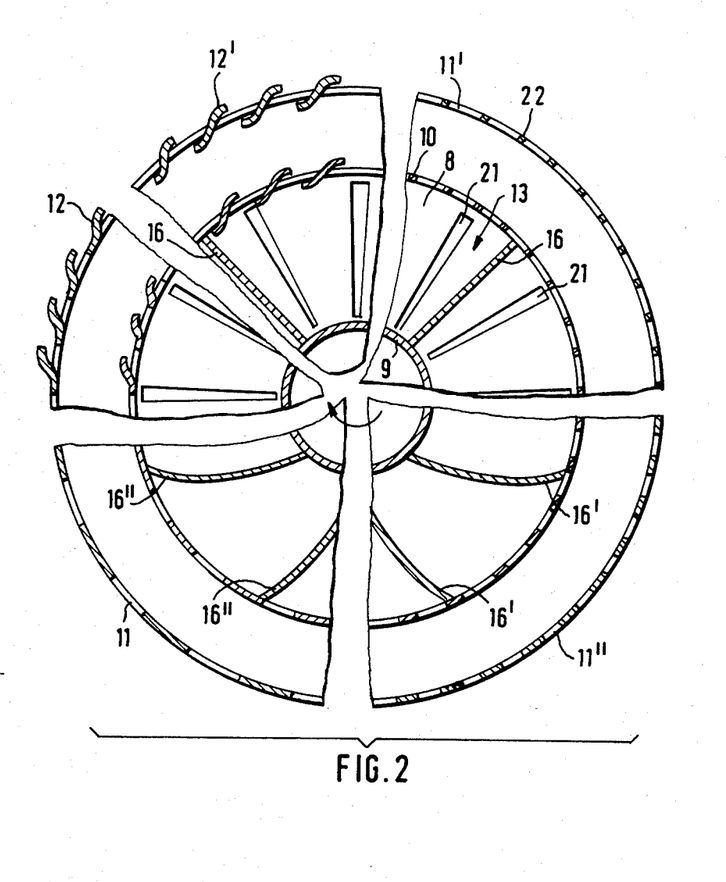
FIG. 2 is a cross-sectional view through another immersion element embodying the present invention showing a variety of structural details.

In FIG. 2 a cross-section through another embodiment of the immersion element is shown with the individual quadrants provided with different variations of the immersion element. An imperforate inner tube 9* is located within the immersion element centered about the central axis with the perforated outer tube 10 arranged concentrically about the inner tube. In addition, a perforated blade tube 22 is arranged concentrically to the inner and outer tubes and is spaced radially outwardly from the outer tube. In this arrangement, the imperforate inner tube 9 can be filled with air. Since the inner tube is always located below the water level of the sewage, the air affords an additional buoyancy compensating not only for the weight of the inner tube but also for a part of the weight of the other parts of the immersion element. As a result, the bearings are relieved from at least a portion of the load and a savings is effected in the energy required to drive the immersion element.

Outer tube 10 and possibly the blade tube 22 may be shaped in a variety of ways. In FIG. 2, two different S-shaped metal tongues or projections 12, 12' are shown bent out in the formation of the oblong holes 11, 11'. The sheet metal tongues 12 can be formed out of the outer tube 10 or the blade tube 12 so that they project outwardly from the outside surface of the tube. As an alternative, the sheet metal tongues 12' can be formed so that they project both outwardly from and inwardly from the tubes 10, 22.

In addition, the perforations in the tubes may be different. The holes 11 can be somewhat longer than the remaining metal webs between adjacent holes or openings extending in the circumferential direction of the tube. While the holes 11 are somewhat larger than the remaining webs, the holes or openings 11' are considerably longer than the remaining metal webs, and the holes 11'' have the same dimension in the circumferential direction as the metal webs separating the holes or openings. Experience has shown that at an adequate circumferential speed, a suction or nozzle effect takes place at the oblong holes so that air is drawn under the water level and the air is distributed into very fine bubbles and such effect is considerably reinforced by the presence of the projections or tongues 12, 12'.

As mentioned above, in the settling tank, due to the joint effect of the outer contour of the immersion element and the centrifugal action of its rotation, a flow results which pumps the sewage axially into the immersion element and then radially out of the element. To afford such a flow path, openings 21, such as radial slots, are provided in the end plates 8. The size of the openings or slots 21 and of the openings or holes 11 in the outer tube 10 must be adjusted to the size of the immersion element so that the support elements 7, note FIG. 7, cannot pass out of the space 13 located between the outside surface of the imperforate inner tube 9* and the inside surface of the perforated outer tube 10.

The centrifugal force generated in the rotation of the immersion element can be varied to a considerable degree—increased or decreased—by installing generally radially extending partitions 16, 16', 16'' between the outside surface of the inner tube 9* and the inside surface of the outer tube 10. These partitions 16, 16', 16'' also divide the interior space 13 into separate chambers and act, in connection with the relatively high circumferential speed of the immersion element, like vanes in a rotary pump. By suitably shaping the partitions, the effect on the centrifugal force can be increased or decreased. If the partitions 16' are convex in the direction of rotation, then the centrifugal force effect is increased. If the partitions 16'' are concave in the direction of rotation then the effect is decreased. With the convex partitions 16' the resistance value is decreased and the opposite is true of the concave partitions 16''. At a suitable angular position, the outwardly directed centrifugal force can be reduced by means of the inwardly directed blade force.

In connection with the pump action of the partitions 16, 16', it would be advantageous to form the inner tube 9* as a perforate member. In such an arrangement, the sewage could be fed centrally through the inner tube 9* so that it passes radially outwardly and is pumped through the space 13 which is filled with the support elements 7 bearing the biological growth.

Figure 3:
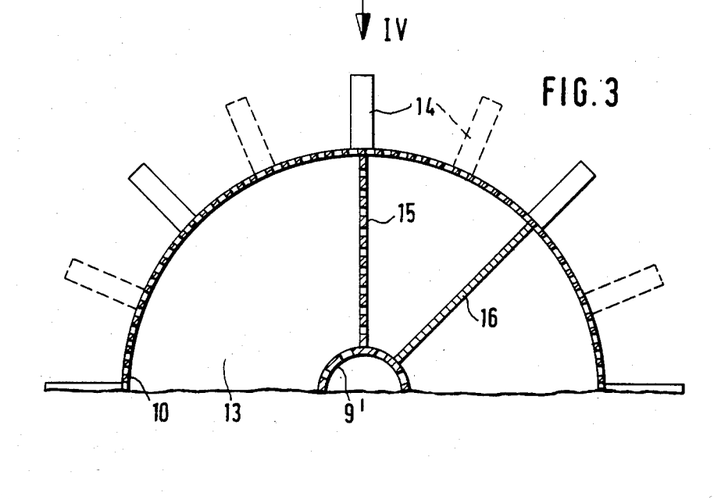
FIG. 3 is a partial cross-sectional view through a further embodiment of an immersion element, incorporating the present invention.
Figure 4:
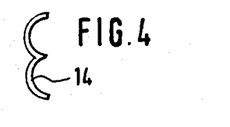
FIG. 4 is a cross-sectional view through a blade shown on the immersion element in FIG. 3.

In FIG. 3 still another embodiment of the immersion element is illustrated including an inner tube 9' and an outer tube 10, shown in cross-section. The space 13 extending between the two tubes is divided by means of partitions 15, 16 with the partitions 15 being perforated and the partitions 16 being imperforate. Blades 14 are located on the outer surface of the outer tube 10 and project radially outwardly from the outer surface. These blades 14 have the cross-sectional shape of Pelton turbine blades, note FIG. 4. The cross-section in FIG. 4 is taken in the direction of the arrow IV in FIG. 3. Blades 14 may be provided alone or in addition to the S-shaped tongues or projections 12 for introducing air and movement energy into the sewage. In place of the blades 14 which must be applied individually, it is also possible to provide an additional radially outer tube as a blade tube for aeration and movement.

The partitions 15, 16 not only limit the space for the motion of the support elements 17 but they also reinforce the structure of the immersion element which is particularly advantageous when very long tubes 9', 10 with a limited outside diameter are used.

Figure 5:
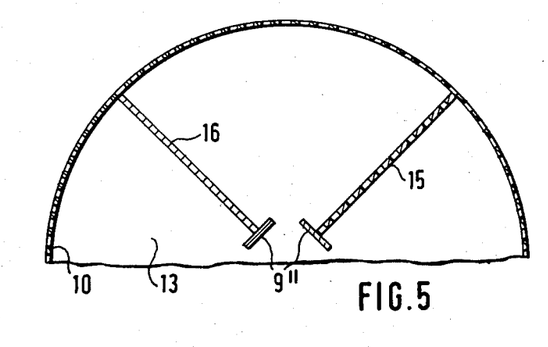
FIG. 5 is a partial cross-sectional view through a further embodiment of an immersion element incorporating the present invention.

In FIG. 5 another embodiment of the immersion element is shown in cross-section. Inner tube 9'' is formed as a polygonal sheet metal cylinder with continuous longitudinal slots. To form the longitudinal slots, the sheet metal plates making up the inner tube 9'' are not welded together, rather they are only spot welded. The sheet metal plates are held by the radially extending partitions 15, 16 which are attached at the radially outer ends to the inside surface of the outer tube 10. As described with respect to FIGS. 1 to 4, the outer tube may be provided with blades 14 as well as with S-shaped bent tongues, 12, 12'. Further, an outside blade tube 22 could also be used.

Figure 6:
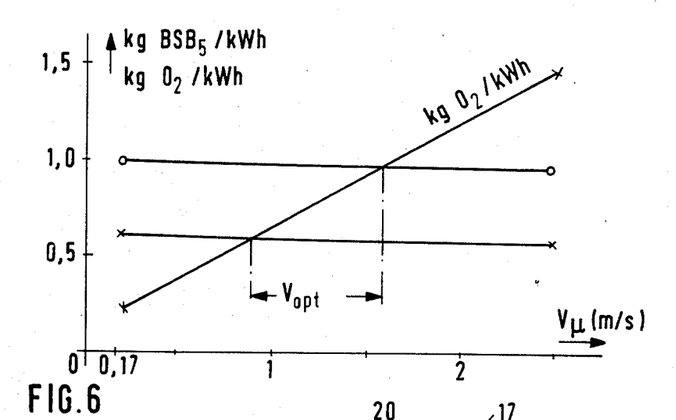
FIG. 6 is a diagrammatic view illustrating the relation between the rotational speed of the immersion element, the entry of air or oxygen into the sewage specific to the power related to the rotational speed, and the biological decomposition efficiency specific to the power.

In FIG. 6 a graph is shown with a rectangular system of coordinates with the speed $V_u$ at the circumference of the outer tube 10 shown in m/s on the X-axis, while the specific biological decomposition efficiency kg $BSB_5$/kWh is shown on the Y-axis, or, alternatively, the specific oxygen input in kg $O_2$/kWh may be shown on the Y-axis. With increasing circumferential speed $V_u$, the specific oxygen input into the sewage increases. The value 0.17, is the circumferential speed of an immersion element generally available on the market and correspond approximately to the subject matter of German Offenlegungsschrift No. 27 27 991, while the surface aerators used today operate at a circumferential speed of 2.5 m/sec.

The specific decomposition efficiency is entered on the graph in form of parameters and is set forth as 0.6 or 1.0 kg $BSB_5$/kWh resp. The value of 1.0 kg $BSB_5$/kWh corresponds to the plant disclosed in the German Offenlegungsschrift No. 27 27 991. The 0.6 value corresponds to the known processes employing surface aerators with horizontal axes. The values relate to average values of different measurements. It is clear that the specific biological decomposition efficiency cannot be increased linearly with the driving power of the immersion element, because it relates to a biological process depending essentially on the availability of oxygen on one hand and nutrients, that is, sewage, on the other. It can be concluded from the graph that an optimum speed range $V_{opt}$ lies between 0.9 and 1.6 m/s. An optimum sewage-air mixture can be reached at circumferential speeds up to 5 m/sec. The circumferential speed of the immersion element according to the present invention is 5 to 10 times greater than for conventional immersion elements.

Figure 7:
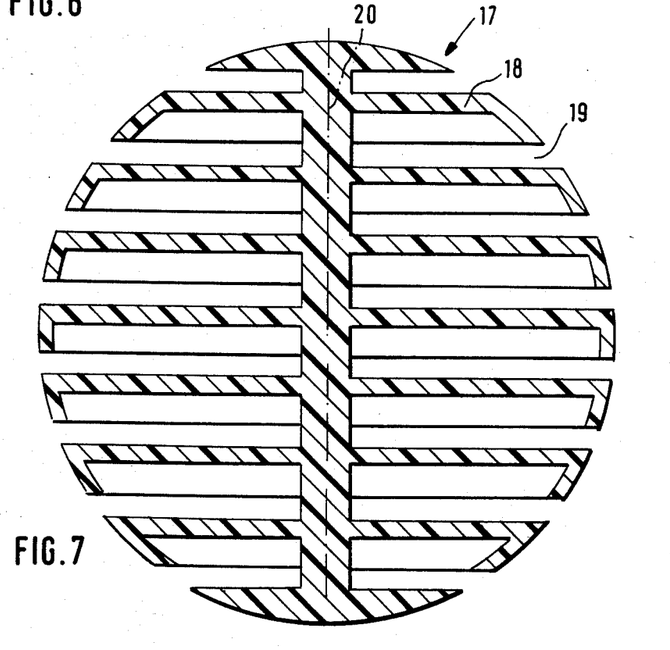
FIG. 7 is a cross-sectional view through a growth or support element.

In FIG. 7 a cross-sectional view is provided of a support element 17 which is preferably formed of plastic. On each side of a center wall 20, a row of webs 18 extend transversely outwardly from the wall with spaces 19 alternating with the webs 18. Since the biological growth forms on the inner surfaces of the webs 18, the spaces 19 must be of a sufficient width to permit the unimpeded access of the sewage-air mixture without any fear of blockages developing. The diameter of such a growth or support element 17 is approximately 5 cm.

Due to the spherical shape of the individual support elements 17, there is sufficient space between them so that there is unimpeded flow of the sewage-air mixture. In a rotating immersion element, the support elements 17 are continuously rotated so that a mechanical cleaning of decayed biological growth is achieved. Only the active well-adhering biological growth which separates polyuronides, remains on the support elements and effects the intensive treatment of the sewage. In addition, the active biological growth is less sensitive to fluctuations in the sewage load.

To prevent adjacent support elements 17 from hooking or interengaging with one another whereby flow blockage would occur and the accumulation of sludge would be increased, at least partially, at the spherical surface of the support element, the width or depth of the webs 18 must be greater than the corresponding dimension of the spaces 19. The remainder of the inside surfaces of the support elements, and this refers to the surfaces inwardly of the spherical surfaces, may be selected so that optimum treatment action is achieved with a minimum sludge accumulation.

A significant advantage, in addition to the above mentioned biological decomposition efficiency, exists in that the immersion element cylinder may be constructed of any desired length. Accordingly, the length between the bearings may be in the range of 5 to 10 meters. Such lengths are possible by omitting a continuous central axis on which other structures are attached. The selected construction of the outer tube and inner tube makes it possible by the appropriate selection of the sheet metal strength and the tube diameter to limit bending between the axle bearings to a justifiable value, and by utilizing an air-filled inner tube these values can be further increased.

While specific embodiments of the invention have been shown and described in detail to illustrate the application of the inventive principles, it will be understood that the invention may be embodied otherwise without departing from such principles.

I claim:

1. A mechanical-biological sewage treatment plant for the purification of sewage includes a settling tank having a water level therein, an immersion element located within said tank and extending below the water level in said tank, said immersion element having a horizontally extending central axis and including a perforated axially elongated outer tube concentrically arranged about the central axis and said outer tube having opposite ends extending transversely of the central axis, support elements for biological growth located within said outer tube, an inner tube located concentrically about the central axis within and spaced radially inwardly from said outer tube and being almost completely submerged below this water level, said inner tube having opposite ends extending transversely of the central axis, means located within said tank for rotatably supporting said immersion element about the central axis, means for forming a closure extending across the opposite ends of said inner and outer tubes, the outer surface of said outer tube having outwardly extending projections for forming an intensely turbulent sewage air mixture as said immersion element rotates for introducing oxygen into the mixture, said support elements having an outside surface and multiple inside surfaces in spaced relation located inwardly from said outside surface, said support elements being movable relative to one another and to said inner and outer tubes, said inside surfaces having a large surface area and said outside surface having multiple openings therethrough leading to said inside surfaces so that the sewage-air mixture flows through the openings and over the inside surfaces.

2. A mechanical-biological sewage treatment plant, as set forth in claim 1, wherein a blade tube is arranged concentrically around and spaced radially outwardly from said outer tube.

3. A mechanical-biological sewage treatment plant, as set forth in claim 1, wherein blades are secured to and extend outwardly from the outside surface of said outer tube.

4. A mechanical-biological sewage treatment plant, as set forth in claim 3, wherein said blades are in the form of Pelton turbine blades.

5. A mechanical-biological sewage treatment plant, as set forth in claim 1, wherein said outer tube is formed of sheet metal, oblong holes are punched out of said sheet metal so that at least a part of the punched out material projects outwardly from the outside surface of said outer tube and forms said projections, the elongated direction of said oblong holes extends in the direction of rotation of said immersion element about the central axis.

6. A mechanical-biological sewage treatment plant, as set forth in claim 5, wherein said punched out material is bent into an S-shape so that at least a portion of the S-shape projects outwardly from the outside surface of said outer tube.

7. A mechanical-biological sewage treatment plant, as set forth in claim 1, wherein said closure means comprises an end plate extending across each of the ends of said inner and outer tube interconnecting the ends and defining a closure for the space formed between said inner and outer tubes.

8. A mechanical-biological sewage treatment plant, as set forth in claim 7, wherein openings are formed in said end plates for affording flow into said space between said inner and outer tubes.

9. A mechanical-biological sewage treatment plant, as set forth in claim 8, wherein the openings in said end plates are in the form of radial slots extending in the direction between the inner tube and the outer tube.

10. A mechanical-biological sewage treatment plant, as set forth in claim 1, wherein radially extending partitions extend between the inner tube and the outer tube and divide the space between the inner tube and the outer tube into individual subspaces.

11. A mechanical-biological sewage treatment plant, as set forth in claim 10, wherein at least certain of said partitions have openings extending therethrough.

12. A mechanical-biological sewage treatment plant, as set forth in claim 7, wherein said partitions are curved in the plane extending transversely of the central axis.

13. A mechanical-biological sewage treatment plant, as set forth in claim 1, wherein said inner tube is perforated having openings extending therethrough.

14. A mechanical-biological sewage treatment plant, as set forth in claim 1, wherein said inner tube is imperforate and is arranged to be filled with air for affording buoyancy.

15. A mechanical-biological sewage treatment plant, as set forth in claim 1, wherein said support elements are spherically shaped with a central wall dividing said support element into two hemispheres with each hemisphere comprising a plurality of webs extending transversely outwardly from said central wall and disposed in spaced relation forming spaces therebetween.

16. A mechanical-biological sewage treatment plant, as set forth in claim 15, wherein said webs at the outer spherical surface of said support elements having a greater thickness than said webs spaced inwardly from said spherical surface so that the space between adjacent said webs is less at said spherical surface and is selected so that adjacent said support elements cannot interengage and prevent relative movement therebetween.

17. A mechanical-biological sewage treatment plant, as set forth in claim 1, wherein in the circumferential direction said outer tube has rows of alternating openings and webs.

18. A mechanical-biological sewage treatment plant, as set forth in claim 17, wherein said openings are longer in the circumferential direction than said webs.

19. A mechanical-biological sewage treatment plant, as set forth in claim 17, wherein said openings and said webs have the same dimension in the circumferential direction of said outer tube.

20. A method of mechanical-biological treatment of sewage in a settling tank containing a water level, a rotatable immersion element supported in the settling tank and extending below the water level with the immersion element including an outer tube and an inner tube spaced radially inwardly from the outer tube and defining a closed space therebetween, including the steps of forming the outer surface of the outer tube with outwardly extending projections so that the projections extend above the water level during rotation of the immersion element, rotating the immersion element about a horizontal central axis for drawing air into and mixing it with sewage, and rotating the immersion element so that the rotational speed at the circumferential periphery of the outer tube is such that an intensely turbulent and thoroughly mixed sewage-air mixture results, providing support elements movable relative to the inner and outer tubes and on which biological growth collects in the space between the inner and outer tube, and flowing the sewage-air mixture through the interior of support elements in contact with the biological growth for effecting the treatment of the sewage.

21. A method, as set forth in claim 20, comprising positioning the immersion element within the settling tank so that the space between the inner tube and the outer tube rotates completely below the water level in the settling tank.

22. A method, as set forth in claim 20; including selecting the size of the support elements so that the support elements are retained within the space between the inner tube and outer tube.

* * * * *